(12) United States Patent
Juels et al.

(10) Patent No.: US 9,305,161 B1
(45) Date of Patent: Apr. 5, 2016

(54) PASSWORD HARDENING SYSTEM USING PASSWORD SHARES DISTRIBUTED ACROSS MULTIPLE SERVERS

(71) Applicant: EMC Corporation, Hopkinton, MA (US)

(72) Inventors: Ari Juels, Brookline, MA (US); Kenneth D. Ray, Seattle, WA (US); Gareth Richards, Oxfordshire (GB)

(73) Assignee: EMC Corporation, Hopkinton, MA (US)

( * ) Notice: Subject to any disclaimer, the term of this patent is extended or adjusted under 35 U.S.C. 154(b) by 129 days.

(21) Appl. No.: 13/925,289

(22) Filed: Jun. 24, 2013

(51) Int. Cl.
  *G06F 21/46* (2013.01)
  *H04L 29/06* (2006.01)
  *G06F 21/30* (2013.01)

(52) U.S. Cl.
  CPC ............ *G06F 21/46* (2013.01); *H04L 63/0428* (2013.01); *G06F 21/30* (2013.01); *H04L 63/08* (2013.01); *H04L 63/083* (2013.01); *H04L 63/10* (2013.01)

(58) Field of Classification Search
  CPC ... H04L 63/08; H04L 63/0428; H04L 63/083; H04L 63/10; G06F 21/30; G06F 21/46
  USPC ............................. 713/193, 171, 182, 18, 183
  See application file for complete search history.

(56) References Cited

U.S. PATENT DOCUMENTS

| | | | | | |
|---|---|---|---|---|---|
| 5,944,824 A * | 8/1999 | He | ........................... | G06F 21/33 | 726/6 |
| 6,003,084 A * | 12/1999 | Green | ..................... | H04L 29/06 | 709/203 |
| 6,959,394 B1 * | 10/2005 | Brickell et al. | ................... | | 726/5 |
| 7,133,922 B1 * | 11/2006 | She | ...................... | H04L 67/1002 | 370/231 |
| 7,958,347 B1 * | 6/2011 | Ferguson | ................ | H04L 9/321 | 713/155 |
| 8,201,217 B1 * | 6/2012 | Begen | ..................... | G06F 21/41 | 726/12 |
| 8,381,272 B1 * | 2/2013 | Nelson | .................. | H04L 9/0861 | 705/18 |
| 8,443,425 B1 * | 5/2013 | Evans | ..................... | G06F 21/31 | 726/26 |
| 8,613,070 B1 * | 12/2013 | Borzycki | ............ | G06F 21/6218 | 726/8 |
| 8,819,444 B2 * | 8/2014 | Shahbazi | .............. | H04L 9/0863 | 713/183 |

(Continued)

OTHER PUBLICATIONS

Xu et al., Protecting Web Usage of Credit Cards Using One-Time Pad Cookie Encryption, 2002, Published by the IEEE, Proc. of the 18th Annual Computer Security Applications Conference, p. 2.*

(Continued)

*Primary Examiner* — Joseph P Hirl
*Assistant Examiner* — Stephen Gundry
(74) *Attorney, Agent, or Firm* — Ryan, Mason & Lewis, LLP

(57) ABSTRACT

A password hardening system is arranged between one or more clients and a domain controller or other authentication entity. The password hardening system comprises a plurality of servers configured to store in a distributed manner respective shares of at least one of a hardened surrogate password and a corresponding user password. The password hardening system is configured to intercept a first set of one or more communications based at least in part on the user password and directed to an authentication entity external to the password hardening system, and to provide to the authentication entity in place of at least a portion of the intercepted first set of one or more communications a second set of one or more communications based at least in part on the hardened surrogate password. The password hardening system may be configured to serve as a proxy between an authenticating client and the authentication entity.

20 Claims, 3 Drawing Sheets

(56) References Cited

U.S. PATENT DOCUMENTS

| | | | |
|---|---|---|---|
| 8,904,181 B1* | 12/2014 | Felsher | H04L 9/0825 380/282 |
| 2001/0047484 A1* | 11/2001 | Medvinsky | H04L 29/06 726/5 |
| 2002/0067832 A1* | 6/2002 | Jablon | H04L 9/0844 380/277 |
| 2002/0138551 A1* | 9/2002 | Erickson | H04L 29/06 709/203 |
| 2002/0150253 A1* | 10/2002 | Brezak et al. | 380/281 |
| 2003/0126259 A1* | 7/2003 | Yoshida | H04L 12/5855 709/225 |
| 2003/0163737 A1* | 8/2003 | Roskind | G06F 21/31 726/6 |
| 2003/0221102 A1* | 11/2003 | Jakobsson | H04L 9/0844 713/171 |
| 2004/0030932 A1* | 2/2004 | Juels | H04L 63/083 713/151 |
| 2005/0154885 A1* | 7/2005 | Viscomi | G06F 9/44521 713/165 |
| 2007/0006291 A1* | 1/2007 | Barari et al. | 726/10 |
| 2007/0061571 A1* | 3/2007 | Hammes | G06F 21/31 713/168 |
| 2007/0289006 A1* | 12/2007 | Ramachandran | H04L 63/08 726/10 |
| 2008/0077809 A1* | 3/2008 | Hayler et al. | 713/193 |
| 2008/0134311 A1* | 6/2008 | Medvinsky | G06F 21/33 726/7 |
| 2008/0235772 A1* | 9/2008 | Janzen | G06F 21/31 726/5 |
| 2009/0222896 A1* | 9/2009 | Ichikawa | G06F 21/575 726/6 |
| 2010/0199336 A1* | 8/2010 | Tan | H04L 63/0846 726/6 |
| 2011/0131415 A1* | 6/2011 | Schneider | H04L 9/3226 713/171 |
| 2011/0314290 A1* | 12/2011 | Fort | G06F 21/31 713/176 |
| 2012/0072714 A1* | 3/2012 | Grandcolas | H04L 9/0825 713/155 |
| 2012/0159588 A1* | 6/2012 | Zhu | H04L 63/0815 726/6 |
| 2013/0019106 A1* | 1/2013 | Fischer | 713/189 |
| 2013/0227291 A1* | 8/2013 | Ahmed | H04L 63/0281 713/171 |
| 2014/0331297 A1* | 11/2014 | Innes | H04L 63/08 726/7 |

OTHER PUBLICATIONS

C. Neuman et al., "The Kerberos Network Authentication Service (V5)," Network Working Group, Request for Comments: 4120, Jul. 2005, 138 pages.

"RainbowCrack Project," http://www.project-rainbowcrack.com, 2013, 1 page.

Nicole Perlroth, "Hackers in China Attacked the Times for Last 4 Months," The New York Times, Jan. 2013, 7 pages.

U.S. Appl. No. 13/795,801 filed in the name of Kenneth J. Taylor et al. on Mar. 12, 2013 and entitled "Distributed Cryptography Using Distinct Value Sets Each Comprising at Least One Obscured Secret Value."

A.J. Menezes et al., "Handbook of Applied Cryptography," CRC Press, Oct. 1996, 794 pages.

* cited by examiner

PASSWORD HARDENING SYSTEM USING PASSWORD SHARES DISTRIBUTED ACROSS MULTIPLE SERVERS

FIELD

The field relates generally to authentication, and more particularly to authentication techniques that involve the use of passwords.

BACKGROUND

In many enterprise environments, a domain controller or other authentication entity stores sets of user passwords, possibly in hashed form. Examples of such authentication entities include Microsoft domain controllers, which typically authenticate users through a service referred to as Active Directory. Password storage in these and other authentication entities can present a critical vulnerability to the security of an enterprise environment. There have been numerous high-profile breaches in which attackers have seized and cracked sets of weak, hashed passwords stored in a Microsoft domain controller, thereby achieving bulk compromise of user accounts. Domain controllers or other similar authentication entities may therefore represent a single point of compromise for a stored set of user passwords.

It is known that security of a hashed password can be improved by utilizing so-called "salt," a random value that serves as an additional input to a hash function applied to the password. However, many enterprise environments perform hashing without the use of salt, often for reasons relating to legacy compatibility.

Particularly vulnerable are domain controllers storing passwords in a deprecated LAN Manager (LM) hash format, which lacks salt and partitions passwords of fourteen or fewer characters in length into seven-character segments, and is therefore vulnerable to fast attack by means of a rainbow table. While Windows Vista and Windows Server 2008 disabled LM hash by default, LM hash is retained in certain networks to ensure compatibility with legacy systems. Even the subsequent, now deprecated NTLMv1 and current recommended NTLMv2 authentication protocols, however, make use of an MD4-based hash function, referred to as NT LAN Manager (NTLM) hash, that lacks salt and is consequently vulnerable to rainbow table attacks. Thus, in these systems, only high-entropy passwords of at least fifteen characters in length are definitively resistant to cracking.

Windows 2000 and subsequent Windows operating system releases recommend utilization of KERBEROS authentication, which is also supported by Active Directory. See IETF RFC 4120, C. Neuman et al., "The Kerberos Network Authentication Service (V5)," July 2005, which is incorporated by reference herein. KERBEROS v5 hashes passwords with salt, creating resistance to rainbow table attacks. But weak user passwords in KERBEROS v5 remain vulnerable to brute-force cracking.

Accordingly, a need exists for improved authentication techniques that can address vulnerabilities associated with weak user passwords.

SUMMARY

Illustrative embodiments of the present invention include password hardening systems that provide increased password security relative to conventional arrangements such as those described above.

In one embodiment, a password hardening system is arranged between one or more clients and a domain controller or other authentication entity. The password hardening system comprises a plurality of servers configured to store in a distributed manner respective shares of at least one of a hardened surrogate password and a corresponding user password. The password hardening system is configured to intercept a first set of one or more communications based at least in part on the user password and directed to an authentication entity external to the password hardening system, and to provide to the authentication entity in place of at least a portion of the intercepted first set of one or more communications a second set of one or more communications based at least in part on the hardened surrogate password.

The password hardening system may be configured to serve as a proxy between an authenticating client and the authentication entity for at least a portion of an authentication session.

The password hardening system may be configured to identify in the intercepted first set of communications authentication information based at least in part on the user password, and to perform an authentication operation using the identified authentication information prior to providing the second set of one or more communications to the authentication entity. The identified authentication information may comprise, for example, the user password itself, or other types of authentication information generated based at least in part on the user password.

Providing the second set of one or more communications to the authentication entity may comprise modifying the first set of one or more communications by replacing authentication information based at least in part on the user password with corresponding authentication information based at least in part on the hardened surrogate password, and providing the modified first set of one or more communications to the authentication entity as the second set of one or more communications.

The password hardening system in some embodiments may be configured to simulate an authentication protocol with a client using the user password and to simulate the authentication protocol with the authentication entity using the hardened surrogate password, such that from a viewpoint of the client the authentication protocol is carried out using the user password and from a viewpoint of the authentication entity the authentication protocol is carried out using the hardened surrogate password.

The password hardening system may be configured to store both the hardened surrogate passwords and the respective corresponding user passwords in a distributed manner across the multiple servers, such that there is no single point of compromise for any of the stored passwords.

Embodiments of the invention can be implemented in a wide variety of different authentication applications, including simple password verification as well as password-based KERBEROS authentication.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

Embodiments of the invention may make use of techniques disclosed in U.S. patent application Ser. No. 13/795,801, filed Mar. 12, 2013 and entitled "Distributed Cryptography Using Distinct Value Sets Each Comprising at least one Obscured Secret Value," which is commonly assigned herewith and incorporated by reference herein. These techniques include storing in multiple servers distinct chaff sets or other types of value sets each of which includes one or more obscured secret values.

Figure 1:
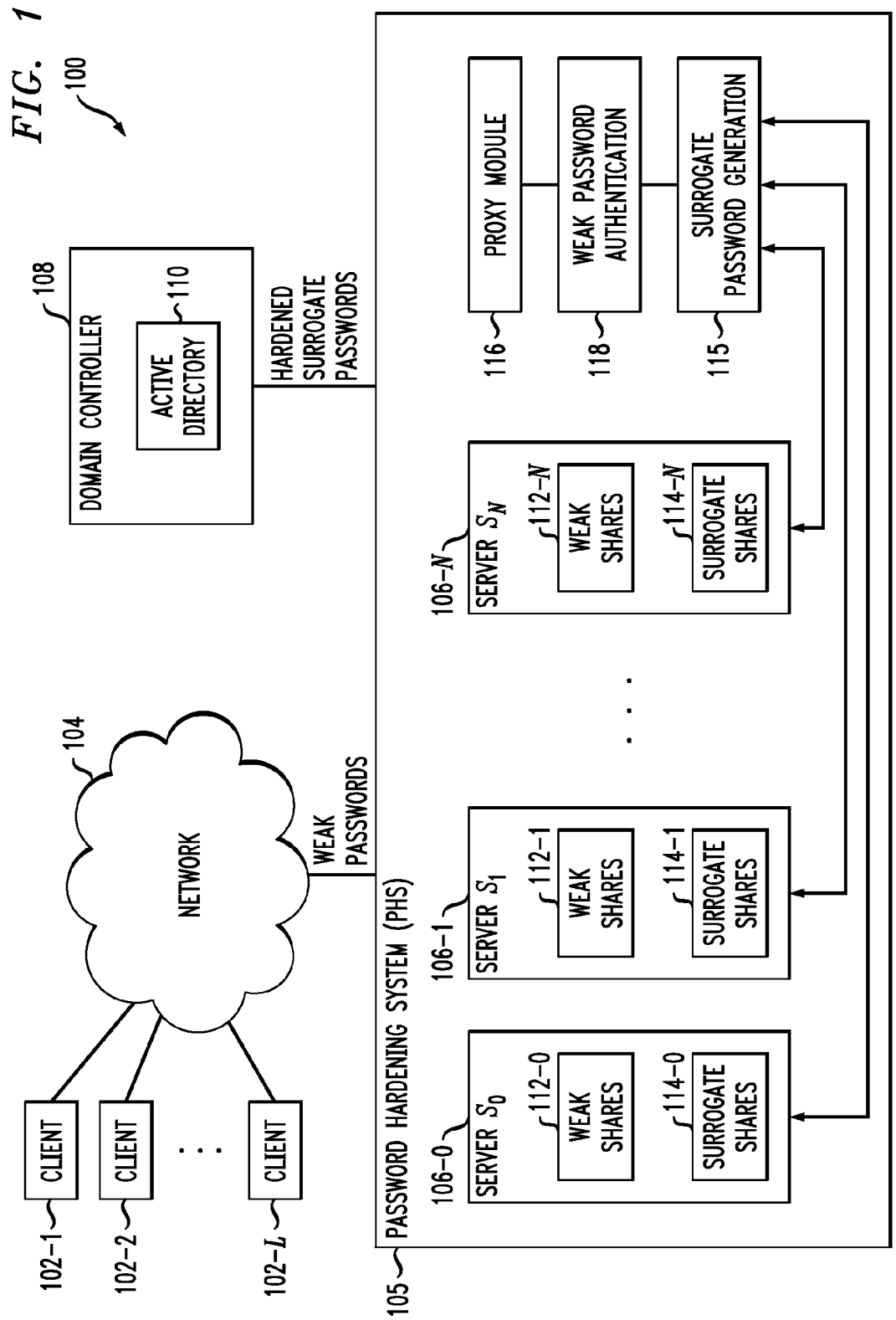
FIG. 1 is a block diagram of a communication system that includes a password hardening system arranged between clients and a domain controller in an illustrative embodiment of the invention.

FIG. 1 shows a communication system 100 that incorporates functionality for password hardening in an illustrative embodiment. The system 100 comprises a plurality of clients 102-1, 102-2, ... 102-L that communicate over a network 104 with a password hardening system 105. The password hardening system 105 comprises a plurality of servers 106-0, 106-1, ... 106-N, also denoted as respective servers $S_0$, $S_1$, ... $S_N$.

The password hardening system or PHS 105 in the present embodiment is illustratively shown as being coupled between the clients 102 and a domain controller 108, although other arrangements are possible. For example, the PHS can be configured to intercept communications between the clients 102 and the domain controller in other ways, without necessarily being coupled between these elements. The domain controller 108 is configured to process authentication attempts from the clients using an Active Directory service 110. Although shown as part of the domain controller 108 in this embodiment, the Active Directory service 110 may be implemented at least in part externally to the domain controller.

The domain controller 108 is an example of what is more generally referred to herein as an authentication entity external to the PHS 105. Numerous other authentication entities may be used in other embodiments. Accordingly, the disclosed arrangements should not be construed as being limited to use with domain controllers, Active Directory services or any other authentication entities.

The PHS 105 is configured to store in a distributed manner across the servers 106 respective shares of a weak user password and respective shares of a hardened surrogate password for the weak user password. This arrangement is assumed to be provided in the present embodiment for multiple weak user passwords and respective corresponding hardened surrogate passwords. Accordingly, servers 106-0, 106-1, ... 106-N comprise memory locations 112-0, 112-1, ... 112-N that store respective weak shares of the weak user passwords and memory locations 114-0, 114-1, ... 114-N that store respective surrogate shares of the hardened surrogate passwords.

Although the servers 106 in the present embodiment store respective shares of both the weak user passwords and the hardened surrogate passwords, in other embodiments the PHS may be configured such that only the weak user passwords or only the hardened surrogate passwords are stored in a distributed manner across the servers 106.

It should be noted that the term "weak user password" as utilized herein is intended to encompass user passwords that are of relatively low entropy, such as passwords that are of fourteen or fewer characters in length and are partitioned into smaller segments for storage as described previously, and are possibly hashed without the use of salt. Accordingly, weak user passwords will generally include passwords that may be hashed or unhashed but are nonetheless vulnerable to fast attack using a rainbow table or similar technique. Weak user passwords are also referred to herein as simply weak passwords.

The corresponding hardened surrogate passwords exhibit substantially higher entropy than the weak user passwords and may be of at least fifteen characters in length and possibly hashed using salt, and are resistant to attacks based on rainbow tables or similar techniques. The hardened surrogate passwords therefore exhibit a substantially higher level of security against compromise than their corresponding weak user passwords. It is to be appreciated that the terms "weak user password" and "hardened surrogate password" as used herein are relative terms, and do not require any particular absolute levels of security.

Also, the term "password" as used herein is intended to be broadly construed so as to encompass passcodes, passphrases and other arrangements of multiple characters or other information utilized in authentication. For example, one-time passcodes generated by a hardware or software authentication token are considered passwords as the latter term is broadly used herein.

The PHS 105 further comprises a surrogate password generation module 115 in communication with each of the servers 106. This module may be part of a controller or other component of the PHS that controls distribution of weak shares 112 and surrogate shares 114 across the servers 106.

Also included in the PHS 105 is a proxy module 116. As will be described in greater detail below, in some embodiments the PHS serves as a proxy between a given authenticating client 102 and the domain controller 108 for at least a portion of an authentication session. For example, in these and other arrangements, the PHS utilizes proxy module 116 and other system components to simulate an authentication protocol with the client 102 using the weak user password and to simulate the authentication protocol with the domain controller 108 using the hardened surrogate password. As a result, from a viewpoint of the authenticating client 102 the authentication protocol is carried out using the weak user password and from a viewpoint of the domain controller 108 the authentication protocol is carried out using the hardened surrogate password.

The PHS 105 is configured to intercept a first set of one or more communications based at least in part on the weak user password and directed to the domain controller 108, and to provide to the domain controller in place of at least a portion of the intercepted first set of one or more communications a second set of one or more communications based at least in part on the hardened surrogate password. The term "set" in this context is intended to be broadly construed, and may comprise a single communication, or a group of multiple communications that are otherwise unrelated.

The provision of the second set of one or more communications to the domain controller 108 may be contingent upon completion of an authentication process in the PHS 105 based on the weak user password. The PHS 105 in the present embodiment therefore further includes a weak password authentication module 118.

The PHS 105 identifies in the intercepted first set of communications authentication information that is based at least in part on the weak user password, and utilizes module 118 to perform one or more authentication operations using the identified authentication information. If this weak password authentication is successful, the PHS provides the second set of one or more communications to the domain controller 108.

The identified authentication information may comprise the user password itself, or authentication information generated based on the user password, such as a ciphertext that is generated using the password.

In the weak password authentication performed in PHS 105 utilizing the weak password authentication module 118, a received input value may be authenticated using indications received from respective ones of the servers $S_0, S_1, \ldots S_N$ that are generated based on at least portions of the received input value and their respective weak shares. For example, the received input value may be accepted as a valid input value only if a specified threshold number of the servers each indicates that the received input value or a portion thereof is acceptable based on its corresponding share. The specified threshold number of the servers may be all of the servers $S_0, S_1, \ldots S_N$. Alternatively, the specified threshold number may be fewer than all but more than a single one of those servers.

The modules 115, 116 and 118 may comprise respective components of a controller of the PHS 105. Such a controller may be configured to direct the overall functionality of the PHS and may be implemented at least in part in the form of software.

As indicated in FIG. 1, at the interface between the clients 102 and the PHS 105, communications arriving over network 104 and associated with authentication attempts are based on weak passwords, and at the interface between the PHS 105 and the domain controller 108, communications associated with authentication attempts are based on corresponding hardened surrogate passwords.

The PHS 105 in the present embodiment may be viewed as being interposed between the clients 102 and the domain controller 108. After successful authentication based on a weak user password, the PHS interacts with the domain controller to perform an authentication using the hardened surrogate password instead of the weak user password. The hardened surrogate password is preferably infeasible to compute from its associated hashed value, and thus resists extraction from a compromised domain controller.

By way of example, when a given one of the clients 102 initiates an authentication session to the domain controller 108, the PHS 105 intercepts it and authenticates the corresponding user based on a weak password P of that user. The PHS 105 then proxies traffic between the given client and the domain controller 108, simulating direct communication between the client and the domain controller, but instantiates into this traffic a hardened surrogate password P*. It is the password P* that is registered for the user on the domain controller.

Thus, in a successful authentication session, in the view of the domain controller, the user authenticates in a protocol-compliant manner using the surrogate password P*. In the view of the client, the user authenticates in a protocol-compliant manner using the weak password P. In arrangements of this type, the PHS 105 may be viewed as converting the weak password P to the hardened surrogate password P* on behalf of the user, while simulating normal protocol functioning for the client and the domain controller. The PHS 105 may be additionally or alternatively be characterized in some embodiments as playing the role of an intermediary that inter-converts messages dependent on P with those dependent on P*.

As mentioned above, the PHS 105 stores both the weak user passwords and the corresponding hardened surrogate passwords across the multiple servers 106. It may reassemble these passwords on an as-needed basis. A transient breach of any one of the servers 106 discloses no substantive password information. Consequently, the PHS deployment illustrated in FIG. 1 protects against bulk password compromise resulting from compromise of the domain controller 108 or any of the servers 106. Such an arrangement advantageously avoids the above-noted conventional practice in which domain controllers become a single point of compromise for weak user passwords.

Any of a wide variety of techniques may be used to distribute shares of the weak and hardened surrogate passwords across the servers 106. For example, the shares of the passwords may be generated and distributed at least in part utilizing chaff sets of the type disclosed in the above-cited U.S. patent application Ser. No. 13/795,801. Accordingly, a given weak or hardened password may be separated into shares that are obscured in respective chaff sets on the respective servers.

As another example, in a two-server embodiment, information generated as a function of the weak or hardened surrogate password and a one-time pad may be stored on one of the servers and the one-time pad stored on another one of the servers. Thus, one server may store $P'\oplus R$, while the other stores R, where, for example, R denotes a one-time pad and, $\oplus$ denotes a bitwise XOR operation.

Alternatively, the PHS 105 can generate and distribute shares of the weak or hardened surrogate passwords using standard secret-sharing techniques. The term "share" as used herein is intended to be broadly construed, and a given share in some embodiments may comprise the password itself suitably obscured with other information, such as the chaff set or one-time pad noted above.

The PHS 105 in the present embodiment can be implemented in a manner that requires no modification of clients 102 or domain controller 108, and imposes minimal overhead on authentication traffic. As mentioned above, the PHS is not limited to use with domain controllers, and can be used with a wide variety of other authentication entities that manage potentially vulnerable weak user passwords.

The particular configuration of the PHS 105 in the FIG. 1 embodiment is exemplary only, and a wide variety of other PHS configurations may be used. Accordingly, the term "password hardening system" as used herein is intended to be broadly construed so as to encompass various arrangements of one or more processing devices that are configured to provide enhanced password security as disclosed herein.

In some embodiments, each of the servers 106 may be coupled to the network 104, such that a given one of the clients 102 can communicate directly with the servers over the network 104. Alternatively, any communications between the given client and one or more of the servers 106 may flow through a centralized controller of the PHS 105.

At least portions of the functionality associated with modules 115, 118 and 116 may also be distributed over the servers 106, rather than implemented in a centralized controller of the PHS 105.

The clients 102 may comprise, for example, mobile telephones, laptop computers, tablet computers or other user devices in any combination. A given one of the clients 102 may be associated with a particular user having a weak user password, where "user" as the term is applied herein should be generally construed so as to encompass a human user or an associated hardware or software entity, or possibly a combination of such elements. For example, a user as that term is utilized herein may comprise a given one of the clients 102, or a human user persistently or temporarily associated with that client. Numerous alternative arrangements are possible.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The communication system 100 may comprise additional elements not explicitly shown. For example, one or more relying servers may be coupled to the network 104. Such relying servers rely on authentication results produced by interaction between clients 102, PHS 105 and domain controller 108. In other embodiments, a given relying server may instead be one or more of the servers 106, or another element of the communication system 100.

The clients 102, servers 106, and modules 115, 116 and 118 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the communication system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the communication system 100, such as the servers 106 and the modules 115, 116 and 118 of the PHS 105, may be implemented at least in part in the form of software that is stored in a memory of a processing device and executed by a processor of that processing device.

The communication system 100 in the present embodiment implements one or more authentication processes involving clients 102, PHS 105 and domain controller 108. Examples of such a process performed at least in part in conjunction with a given one of the clients 102 authenticating to the domain controller 108 using the Active Directory service 110 will be described below, but it should be understood that numerous other types of processes may be used in other embodiments.

It is to be appreciated that the particular set of elements shown in FIG. 1 for providing password hardening functionality using shares distributed over multiple servers is presented by way of example, and in other embodiments additional or alternative elements may be used. Thus, another embodiment may include additional networks and additional sets of clients or servers. In particular, the arrangement of multiple servers and other modules used to implement the PHS may be varied in other embodiments.

As mentioned previously, various elements of system 100 such as clients, servers, controllers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the flow diagram of FIG. 2, which illustrates a set of operations performed primarily by PHS 105 and domain controller 108 in conjunction with an authentication attempt by a given one of the clients 102 in an illustrative embodiment.

The process as shown includes steps 200 through 208, of which steps 200, 202, 204 and 208 are assumed to be performed by the PHS 105 and step 206 is assumed to be performed by the domain controller 108. It is to be appreciated that in other embodiments one or more such steps may be implemented at least in part by other system elements.

In step 200, the PHS 105 stores in servers $S_0, S_1, \ldots S_N$ respective shares of each of a plurality of weak user passwords and respective shares of each of a plurality of hardened surrogate passwords.

In step 202, the PHS 105 intercepts a set of one or more communications that are based at least in part on a given weak user password and are directed from one of the clients 102 to the domain controller 108. For example, the PHS 105 may be configured to intercept any client messages initiating authentication sessions with the domain controller 108. Such interception may be facilitated in some embodiments by mapping the PHS 105 to the domain name or IP address of the domain controller 108. Numerous other types of interception may be used, and the term is therefore intended to be broadly construed herein.

In step 204, the PHS 105 provides to the domain controller 108 in place of at least a portion of the intercepted first set of one or more communications a second set of one or more communications based at least in part on a hardened surrogate password corresponding to the given weak user password.

In step 206, the domain controller 108 authenticates the user based at least in part on the received second set of one or more communications and sends the authentication result back to the PHS 105.

In step 208, the PHS provides the authentication result from the domain controller 108 back to the client.

In some implementations of the above-described process, the PHS 105 simulates domain controller responses to the client and client authentication messages to the domain controller. For example, upon interception of a client authentication attempt directed to the domain controller, the PHS may be configured to simulate the domain controller authentication protocol with the client using weak user password P. If the authentication using P is successful, the PHS reassembles the hardened surrogate password P* from the distributed shares, simulates the authentication protocol with the domain controller on behalf of the client using P*, and then proxies any remaining traffic between the client and the domain controller. If the authentication using P is unsuccessful, the PHS terminates the session.

In other implementations of the above-described process, the PHS 105 uses a message-substitution approach. For example, with certain authentication protocols and environments, the PHS may proxy all traffic between the client and the domain controller, modifying messages rather than simulating domain controller and client communications. The PHS then verifies the correctness of client message elements computed using P and replaces them with equivalent elements computed using P*, and vice versa.

As a more particular example, in KERBEROS v5 with pre-authentication, a client initiates an authentication session by sending an AS-REQ message of the form $SV=(c=enc_{\kappa_{user}}[\tau],\tau)$. Here enc is a symmetric-key encryption function, $\kappa_{user}$ is a user secret user derived by hashing P, and $\tau$ is a timestamp.

The PHS 105 can be configured to operate using KERBEROS v5 with pre-authentication by implementing the following steps to substitute P* for P in AS-REQ messages:
 1. Intercept SV.
 2. Verify the correctness of c under P.
 3. Compute $c^*=enc_{\kappa_{user}^*}[\tau]$, where $\kappa_{user}^*$ is derived from P*.
 4. Forward $SV^*=(c^*,\tau)$ to the domain controller.

The resulting reply message, called AS-REP, contains a ticket-granting ticket (TGT) encrypted under P*. Thus, the PHS decrypts the ticket using P* and re-encrypts it under P In this case, the PHS may retain P and P* in assembled form while awaiting the AS-REP reply message. Alternatively, the PHS may store P and P* as sets of shares across the respective servers 106, and verify the correctness of the ciphertext in AS-REP in a distributed manner before reassembling P.

In some domain controller authentication protocol variants, the client and the Active Directory service bind message flows to the IP addresses of the entities with which they communicate. For example, in KERBEROS, a TGT may include the IP address of the authenticated client. In such cases, the PHS should be configured to operate transparently, such that there is no modification to the apparent IP addresses of the domain controller or client during an authentication session. One way to achieve this is to co-locate an element of the PHS at the same IP address (e.g., the same host) as the domain controller. Alternatively, in an implementation of the message-substitution approach, provided the channel between the domain controller and client is not cryptographically protected, the PHS can operate as a network tap or router in front of the domain controller, modifying traffic without operating as an explicit communicating entity.

Figure 2:
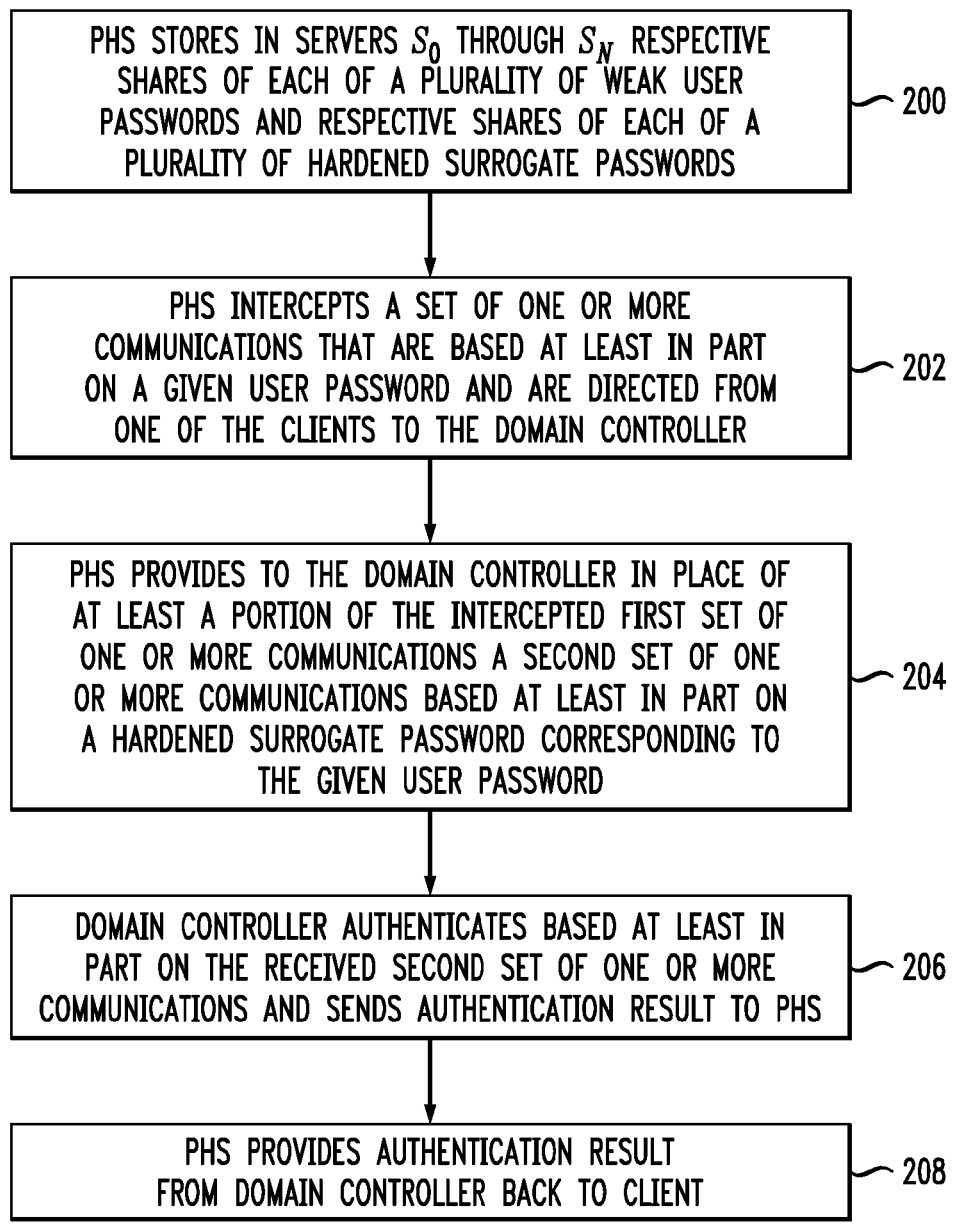
FIG. 2 is a flow diagram illustrating an exemplary authentication process performed in the FIG. 1 system.

The particular processing operations and other system functionality described in conjunction with the flow diagram of FIG. 2 are presented by way of illustrative example only, and should not be construed as limiting the scope of the invention in any way. Alternative embodiments can use other types of processing operations for providing password hardening functionality using password shares distributed over multiple servers. For example, the ordering of the process steps may be varied in other embodiments, or certain steps may be performed concurrently with one another rather than serially. Also, the processing operations and associated messaging in the examples of the simulation and message-substitution approaches above can be varied in other embodiments.

It should also be understood that password hardening functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments avoid situations in which a domain controller or other authentication entity is a single point of compromise for weak user passwords, while also providing enhanced security in a wide variety of different authentication contexts.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
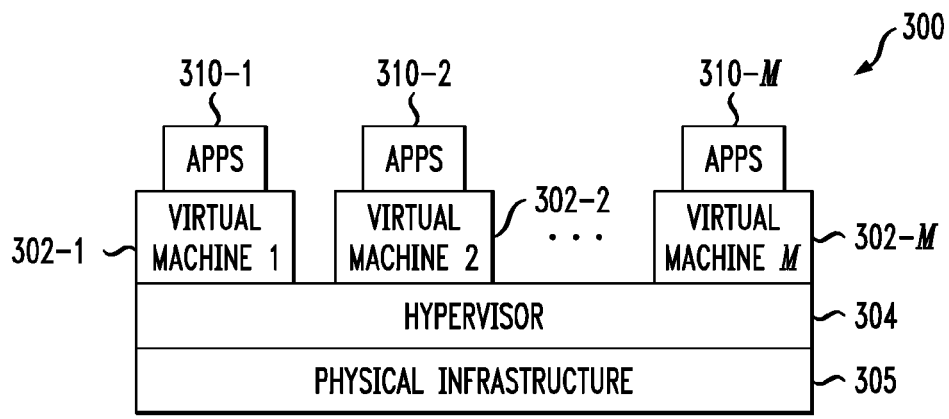
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304.

The cloud infrastructure 300 may encompass the entire system 100 or only portions of that system, such as the password hardening system 105 or one or more of its associated servers or other modules.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
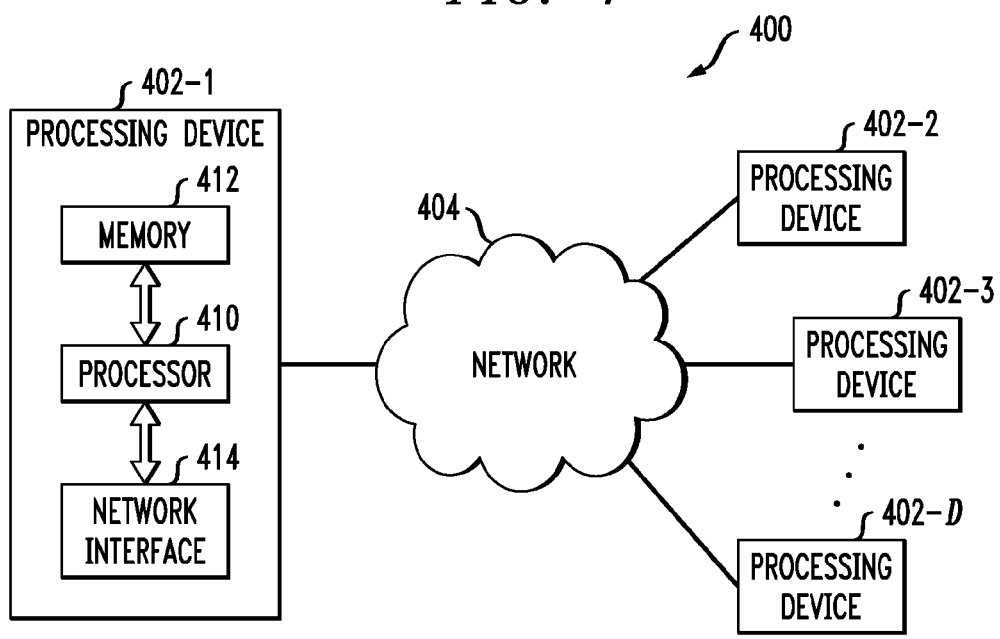

Another example of a processing platform is processing platform 400 shown in FIG. 4. The processing platform 400 in this embodiment comprises at least a portion of the system 100 and includes a plurality of processing devices, denoted 402-1, 402-2, 402-3, ... 402-D, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from password hardening as disclosed herein. Also, the particular configuration of communication system and processing device elements shown in FIGS. 1-4, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    storing in a distributed manner across a plurality of servers of a password hardening system respective shares of at least one of a hardened surrogate password and a corresponding user password, the hardened surrogate password exhibiting a higher level of security against compromise relative to the user password;
    intercepting in the password hardening system a first set of one or more communications based at least in part on the user password from a client and directed to an authentication entity external to the password hardening system; and
    providing from the password hardening system to the authentication entity in place of at least a portion of the intercepted first set of one or more communications a second set of one or more communications based at least in part on the hardened surrogate password;
    wherein the password hardening system simulates an authentication protocol between the authentication entity and the client by:
        providing one or more simulated authentication entity responses based on the user password to the client; and
        providing one or more simulated client messages based on the hardened surrogate password to the authentication entity;
    wherein providing the second set of one or more communications to the authentication entity comprises:
        verifying correctness of first authentication information in the first set of one or more communications under the user password;
        computing second authentication information based on the hardened surrogate password;
        modifying the first set of one or more communications to include the second authentication information; and
        providing the modified first set of one or more communications to the authentication entity as the second set of one or more communications; and
    wherein the storing, intercepting and providing are implemented by at least one processing platform comprising at least one processing device.

2. The method of claim 1 wherein the authentication entity external to the password hardening system comprises a domain controller configured to process the authentication attempt using an active directory service.

3. The method of claim 1 wherein said storing comprises:
    storing in the plurality of servers respective shares of the hardened surrogate password; and
    storing in the plurality of servers respective shares of the corresponding user password.

4. The method of claim 1 further comprising:
    authenticating the client using the authentication protocol based at least in part on the user password; and
    if the authentication of the client is successful, reconstructing the hardened surrogate password from its shares stored on the respective servers, and carrying out the authentication protocol with the authentication entity on behalf of the client using the one or more simulated client messages, wherein the one or more simulated client messages use the hardened surrogate password in place of the user password.

5. The method of claim 1 wherein the password hardening system serves as a proxy between an authenticating client and the authentication entity for at least a portion of an authentication session.

6. The method of claim 1 further comprising:
    identifying in the intercepted first set of communications the first authentication information based at least in part on the user password; and
    performing an authentication operation using the identified authentication information prior to providing the second set of one or more communications to the authentication entity.

7. The method of claim 6 wherein the identified authentication information comprises the user password itself.

8. The method of claim 1 wherein the password hardening system simulates the authentication protocol with the client using the user password and the one or more simulated authentication entity responses and wherein the password hardening system simulates the authentication protocol with the authentication entity using the hardened surrogate password and the one or more simulated client messages, such that from a viewpoint of the client the authentication protocol is carried out using the user password and from a viewpoint of the authentication entity the authentication protocol is carried out using the hardened surrogate password.

9. The method of claim 1 wherein storing respective shares of at least one of the hardened surrogate password and the corresponding user password comprises storing said shares such that the shares are obscured in respective chaff sets on the respective servers.

10. The method of claim 1 wherein storing respective shares of at least one of the hardened surrogate password and the corresponding user password comprises storing information generated as a function of the password and a one-time pad on one of the servers and storing the one-time pad on another one of the servers.

11. The method of claim 1 wherein intercepting the first set of one or more communications comprises intercepting at least one communication associated with an authentication session initiated by the client and directed from the client to the authentication entity in conjunction with an authentication attempt.

12. The method of claim 11 wherein said at least one communication comprises an authentication session initiation message.

13. The method of claim 12 wherein the authentication session initiation message comprises a request message of the form $SV=(c=enc_{\kappa_{user}}[\tau],\tau)$, where c is a user ciphertext, enc is a symmetric-key encryption function, $\kappa_{user}$ is a user secret derived by hashing the user password, and $\tau$ is a timestamp.

14. The method of claim 13 further comprising:
verifying the correctness of c under the user password; and
computing $c^*=enc_{\kappa_{user}^*}[\tau]$, where $\kappa_{user}^*$ is derived from the hardened surrogate password;
wherein providing the second set of one or more communications comprises forwarding a modified request message $SV^*=(c^*,\tau)$ to the authentication entity.

15. The method of claim 14 further comprising:
receiving in the password hardening system from the authentication entity in response to the modified request message a reply message containing a ticket encrypted under the hardened surrogate password;
decrypting the ticket using the hardened surrogate password;
re-encrypting the ticket under the user password; and
sending the re-encrypted ticket to the client.

16. A processing device comprising a hardware processor coupled to a memory and configured to perform the method of claim 1.

17. A computer program product comprising a non-transitory processor-readable storage medium having embodied therein one or more software programs, wherein the one or more software programs when executed by at least one processing device cause the at least one processing device:
to store in a distributed manner across a plurality of servers of a password hardening system respective shares of at least one of a hardened surrogate password and a corresponding user password, the hardened surrogate password exhibiting a higher level of security against compromise relative to the user password;
to intercept in the password hardening system a first set of one or more communications based at least in part on the user password from a client and directed to an authentication entity external to the password hardening system; and
to provide from the password hardening system to the authentication entity in place of at least a portion of the intercepted first set of one or more communications a second set of one or more communications based at least in part on the hardened surrogate password;
wherein the password hardening system simulates an authentication protocol between the authentication entity and the client by:
providing one or more simulated authentication entity responses based on the user password to the client; and
providing one or more simulated client messages based on the hardened surrogate password to the authentication entity; and
wherein providing the second set of one or more communications to the authentication entity comprises:
verifying correctness of first authentication information in the first set of one or more communications under the user password;
computing second authentication information based on the hardened surrogate password;
modifying the first set of one or more communications to include the second authentication information; and
providing the modified first set of one or more communications to the authentication entity as the second set of one or more communications.

18. An apparatus comprising:
a password hardening system comprising a plurality of servers configured to store in a distributed manner respective shares of at least one of a hardened surrogate password and a corresponding user password, the hardened surrogate password exhibiting a higher level of security against compromise relative to the user password;
wherein the password hardening system is configured to intercept a first set of one or more communications based at least in part on the user password from a client and directed to an authentication entity external to the password hardening system, and to provide to the authentication entity in place of at least a portion of the intercepted first set of one or more communications a second set of one or more communications based at least in part on the hardened surrogate password;
wherein the password hardening system simulates an authentication protocol between the authentication entity and the client by:
providing one or more simulated authentication entity responses based on the user password to the client; and
providing one or more simulated client messages based on the hardened surrogate password to the authentication entity;
wherein the password hardening system is configured to provide the second set of one or more communications to the authentication entity by:
verifying correctness of first authentication information in the first set of one or more communications under the user password;
computing second authentication information based on the hardened surrogate password;
modifying the first set of one or more communications to include the second authentication information; and
providing the modified first set of one or more communications to the authentication entity as the second set of one or more communications; and
wherein the password hardening system is implemented using at least one processing device comprising a hardware processor coupled to a memory.

19. The apparatus of claim 18 wherein the password hardening system is configured to serve as a proxy between an authenticating client and the authentication entity for at least a portion of an authentication session.

20. The method of claim 1 wherein modifying the first set of one or more communications to include the second authentication information comprises replacing the first authentication information with the second authentication information.

* * * * *